(12) United States Patent
Suzuki et al.

(10) Patent No.: US 7,505,799 B2
(45) Date of Patent: Mar. 17, 2009

(54) MOBILE ELECTRONIC APPARATUS AND FUNCTION CONTROL METHOD AND PROGRAM FOR THE MOBILE ELECTRONIC APPARATUS

(75) Inventors: Nobuyo Suzuki, Chiba (JP); Seiji Muramatsu, Saitama (JP); Yujin Ohsawa, Kanagawa (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 157 days.

(21) Appl. No.: 11/348,411

(22) Filed: Feb. 7, 2006

(65) Prior Publication Data
US 2006/0189345 A1 Aug. 24, 2006

(30) Foreign Application Priority Data
Feb. 18, 2005 (JP) ............................ 2005-042480

(51) Int. Cl.
*H04M 1/00* (2006.01)
(52) U.S. Cl. ................................. 455/575.3; 455/550.1
(58) Field of Classification Search .............. 455/575.3, 455/90.1, 550.1, 566, 3.06
See application file for complete search history.

(56) References Cited

U.S. PATENT DOCUMENTS

| 5,175,759 | A | 12/1992 | Metroka et al. |
| 5,241,583 | A | 8/1993 | Martensson |
| 6,549,789 | B1 | 4/2003 | Kfoury |
| 6,996,422 | B2 * | 2/2006 | Moriki ........................ 455/566 |
| 7,321,789 | B2 * | 1/2008 | Ishihara et al. ............ 455/575.3 |
| 2004/0072589 | A1 * | 4/2004 | Hamamura et al. ........ 455/550.1 |
| 2004/0171375 | A1 * | 9/2004 | Chow-Toun ................. 455/418 |
| 2007/0167196 | A1 * | 7/2007 | Yamashita et al. ........ 455/575.1 |

FOREIGN PATENT DOCUMENTS

| GB | 2 291 560 A | 1/1996 |
| JP | 62-11354 | 1/1987 |
| JP | 10-042357 | 2/1998 |
| JP | 11-355432 | 12/1999 |
| JP | 2003-258979 A | 9/2003 |
| JP | 2003-309643 | 10/2003 |
| JP | 2004-128780 | 4/2004 |
| JP | 2004-355088 | 12/2004 |
| JP | 2005-006219 | 1/2005 |
| JP | 2003-283649 | 10/2005 |
| WO | WO 98/19434 | 5/1998 |
| WO | WO 98/38779 | 9/1998 |

* cited by examiner

*Primary Examiner*—Olisa Anwah
(74) *Attorney, Agent, or Firm*—Oblon, Spivak, McClelland, Maier & Neustadt, P.C.

(57) ABSTRACT

A mobile phone terminal is provided in which first and second housings can be set to open and close states via a hinge portion. In the case that the terminal is at least in the close state and an electronic wallet function is locked, when side keys, namely, an "F" key, and a camera key, are depressed in an authentication registration sequence, then an electronic wallet lock can be temporarily released. On the other hand, in the case that the terminal is in the open state, when a personal ID number is input by using, for example, ten keys provided on the first housing, then the electronic wallet lock can be released. Thereby, in the mobile electronic apparatus enabling the apparatus shape to be changed, a security function is maintained, and concurrently, the lock of the electronic wallet function can be easily and speedily released.

17 Claims, 10 Drawing Sheets

| ELECTRONIC WALLET LOCK RELEASE METHODS | PATTERNS | SECURITY |
|---|---|---|
| ELECTRONIC WALLET LOCK PASSWORD INPUT (FOUR DIGITS) | 10,000 (PATTERNS) | HIGH |
| RELEASE QUICKLOCK SIDE-KEY CONTINUOUS DEPRESSION (USER SELECTION: 0 TO 4 TIMES) | 1 TO 81 (PATTERNS) (BY USER SELECTION) | INTERMEDIATE |
| NO ELECTRONIC WALLET LOCK | — | LOW |

MOBILE ELECTRONIC APPARATUS AND FUNCTION CONTROL METHOD AND PROGRAM FOR THE MOBILE ELECTRONIC APPARATUS

CROSS REFERENCES TO RELATED APPLICATIONS

The present invention contains subject matter related to Japanese Patent Application JP 2005-042480 filed in the Japanese Patent Office on Feb. 18, 2005, the entire contents of which being incorporated herein by reference.

BACKGROUND OF THE INVENTION

1. Field of the Invention

The present invention relates to a mobile electronic apparatus, such as a mobile phone terminal or a personal digital assistant (PDA), for example. The invention further relates to a function control method and program for controlling functions of the mobile electronic apparatus.

2. Related Art

In recent years, electronic cash transactions have been practically carried out. In such a transaction, an IC card (so-called electronic wallet) having, for example, cash flow and/or settlement functions are used to make payment of, for example, a purchase price in the event of purchase of merchandise and fare payment in the event of use of railway services. In particular, in recent years, mobile electronic apparatuses, such as mobile telephone terminals including an electronic wallet function using a contactless IC card (so-called electronic wallet) capable of short-distance radio communication, are becoming increasing popular.

In the event that such the mobile telephone terminal including the electronic wallet function is inadvertently forgotten or stolen in an outside site, a case can take place in which the electronic wallet of the mobile electronic apparatus is illegally used. Such illegal use of the electronic wallet resultantly imposes pecuniary damage on an owner of the card. As such, existing mobile telephone terminals including the electronic wallet function has the function of locking the electronic wallet not to be illegally used.

Generally, existing mobile telephone terminals including the electronic wallet function arranged such that when locking the electronic wallet, the screen shifts from a hierarchical menu to a menu on the electronic wallet lock, and specification of the electronic wallet lock is carried out on that screen. In a more specific example, a main menu screen is first displayed on a display mounted in the apparatus, and a menu item on function specification is selected from multiple menu items included in the main menu screen. Then, a menu item on access limitations is selected from the multiple menu items included in the menu, and further, a menu item for specifying the electronic wallet lock is selected from the multiple menu items included in the menu. Thereafter, an operation is carried out in the menu to turn on the electronic wallet lock. In the event of initial setup or initialization for the electronic wallet lock, also registration of a personal identification number is carried out.

On the other hand, in the case that the electronic wallet is locked, also when the lock is released, operations are carried out similarly as in the case of locking the electronic wallet. That is, the screen shifts from a hierarchical menu to a menu on the electronic wallet lock, and releasing of the electronic wallet lock is carried out on that screen. In a more specific example, a main menu screen is first displayed on the display, and a menu item on the function specification is selected from multiple menu items included in the main menu screen. Then, a menu item on privacy is selected from the multiple menu items included in the menu. Then, a menu item on access limitations is selected from the multiple menu items included in the menu, and further, a menu item for releasing the electronic wallet lock is selected from the multiple menu items included in the menu. On the menu for releasing the electronic wallet lock, a personal identification number is required to be input, whereby the electronic wallet lock is released only when a correct personal identification number has been input.

Japanese Unexamined Patent Application Publication No. 62-11354 discloses a function locking method for an automobile telephone system. According to the disclosure, the method is such that a lock code is pre-registered in memory, and the locking system is not released unless the lock code is input.

In addition, Japanese Unexamined Patent Application Publication No. 11-355432 discloses a dial lock release method for a mobile communication terminal. According to the disclosure, the method is such that a function key, an off-hook key, an on-hook key, or specific dial keys are operated, thereby to enable release or temporary release of the dial lock of the mobile communication terminal.

Mobile phone terminals as described above by way of examples of mobile electronic apparatuses include various types. One of them is a so-called foldable mobile phone terminal, for example. In this case, for example, an apparatus housing is sectioned into at least two, first and second housings. The first and second housings are coupled by a hinge or the like to be foldable thereabout so as to be overlap with one another. Of the two housings, one housing (first housing) is provided with a display, such as an LC (liquid crystal) panel, and the upper surface (opposing a display surface of the first housing when folded) of the other housing (second housing) is provided with, for example, ten keys, a call key, a termination/power key, and a menu operation device.

In the case of the foldable mobile phone terminal with the electronic wallet function mounted, operation of opening the foldable mobile phone terminal has first to be carried out before the above-described series of operations of locking the electronic wallet and releasing the lock thereof. That is, the operation of opening the terminal is added to the originally complicated operation in which the menu hierarchy is sequentially traced. Consequently, the operations of locking the electronic wallet and releasing the lock thereof in the foldable mobile phone terminal become very complicated, time-consuming operations.

In particular, suppose that a settlement system for the electronic wallet is installed in, for example, an automatic checking and collecting machine of a station or a store, and the mobile phone terminal including the electronic wallet function is used to pass through the automatic checking and collecting machine or to do shopping in the store. In this case, if it takes a time to carry out the lock release operation, case can take place in which, for example, the flow of users is stopped or the settlement cannot be smoothly carried out, therefore causing congestion near a checkout counter.

From these facts, while holding a mobile phone terminal including an electronic wallet lock function of the above-described type, many users use the terminal in an undesirable state in security without using the electronic wallet lock function.

SUMMARY OF THE INVENTION

The present invention is herewith proposed in view of the situations as described above. Accordingly, it is desirable to provide us the invention is intended to provide a mobile electronic apparatus that, as a foldable mobile phone terminal, is flexible in the apparatus shape and that enables simple and speedy lock-release (or, unlocking) of an electronic wallet function while maintaining a security function. Further, it is desirous to provide a function control method and program for the mobile electronic apparatus.

According to an embodiment of the present invention, a mobile electronic apparatus includes at least two housings, namely, a first housing and a second housing; a hinge portion that couples the first housing and the second housing and that is able to change a relative positional state of the first housing and the second housing to at least two positional states, namely, a first positional state and a second positional state; a first operation section that is provided on any one of the first and second housings and that is operable by a user in a case that the relative positional state of the first and second housings is the first positional state; a second operation section that is provided on any one of the first and second housings and that is operable by the user only in a case that the relative positional state of the first and second housings is the second positional state; and a control section that controls an operation mode of the apparatus to any one of a first lock release mode and a second lock release mode in a case that a predetermined function is locked to a stopped state, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section, and that controls the operation mode to the first lock release mode in a case that the positional state is at least the first positional state. Thereby, the problems described above are solved.

According to another embodiment of the present invention, a mobile electronic apparatus is provided that works as a mobile phone terminal wherein a first housing and a second housing can be set to open and close states via a hinge portion. The apparatus includes a first lock release function with which, in a case that the first and second housings are in the close state and a predetermined function is locked, a lock of the predetermined function is temporarily released when a first operation section disposed in a position to be able to be operated by a user in the close state is depressed in a pre-registered sequence; and a second lock release function with which, in a case that the first and second housings are in the open state and the predetermined function is locked, the lock of the predetermined function is released when a second operation section provided on any one of the first and second housings is operated.

According to a still another embodiment of the present invention, a function control method for a mobile electronic apparatus including at least two housings, namely, a first housing and a second housing; a hinge portion that couples the first housing and the second housing and that is able to change a relative positional state of the first housing and the second housing to at least two positional states, namely, a first positional state and a second positional state; a first operation section that is provided on any one of the first and second housings and that is operable by a user in a case that the relative positional state of the first and second housings is the first positional state; and a second operation section that is provided on any one of the first and second housings and that is operable by the user only in a case that the relative positional state of the first and second housings is the second positional state. The function control method includes a step wherein a control section locks the predetermined function to a stopped state; and a step wherein, in a case that the predetermined function is locked by the control section to the stopped state, the control section controls an operation mode to any one of a first lock release mode and a second lock release mode, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section, and the control section controls the operation mode to the first lock release mode in a case that the positional state is at least the first positional state. Thereby, the problems described above are solved.

According to yet another embodiment of the present invention, a function control program for a mobile electronic apparatus including at least two housings, namely, a first housing and a second housing; a hinge portion that couples the first housing and the second housing and that is able to change a relative positional state of the first housing and the second housing to at least two positional states, namely, a first positional state and a second positional state; a first operation section that is provided on any one of the first and second housings and that is operable by a user in a case that the relative positional state of the first and second housings is the first positional state; and a second operation section that is provided on any one of the first and second housings and that is operable by the user only in a case that the relative positional state of the first and second housings is the second positional state, the function control program causing the mobile electronic apparatus to function as a control section. In a case that the predetermined function is locked by the control section to the stopped state, the control section controls an operation mode to any one of a first lock release mode and a second lock release mode, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section, and the control section controls the operation mode to the first lock release mode in a case that the positional state is at least the first positional state.

According to the embodiments of the present invention, when the predetermined function is locked to the stopped state, the operation mode is set to the lock release mode corresponding to the positional state of the first and second housings. In the case that the relative positional state of the first and second housings is at least the first positional state, when the operation mode is controlled to the first lock release mode, then the predetermined function in the stopped state can be temporarily released through the predetermined operation performed from the first operation section. Thereby, in a foldable mobile phone terminal enabling the positional state of two housings, for example, a security function is maintained, and concurrently, a predetermined function of an electronic wallet function or the like can be easily and speedily performed.

DETAILED DESCRIPTION OF THE PREFERRED EMBODIMENTS

Referring to the drawings, a so-called foldable mobile phone terminal will be described herebelow by way of example as an embodiment of a mobile electronic apparatus according to the present invention. While the foldable mobile phone terminal is thus exemplified as the present embodiment, it is to be understood that the contents described herebelow is of course an example, so that the present invention is not limited by the example.

(General Exterior Configuration of Mobile Phone Terminal)

Figure 1:
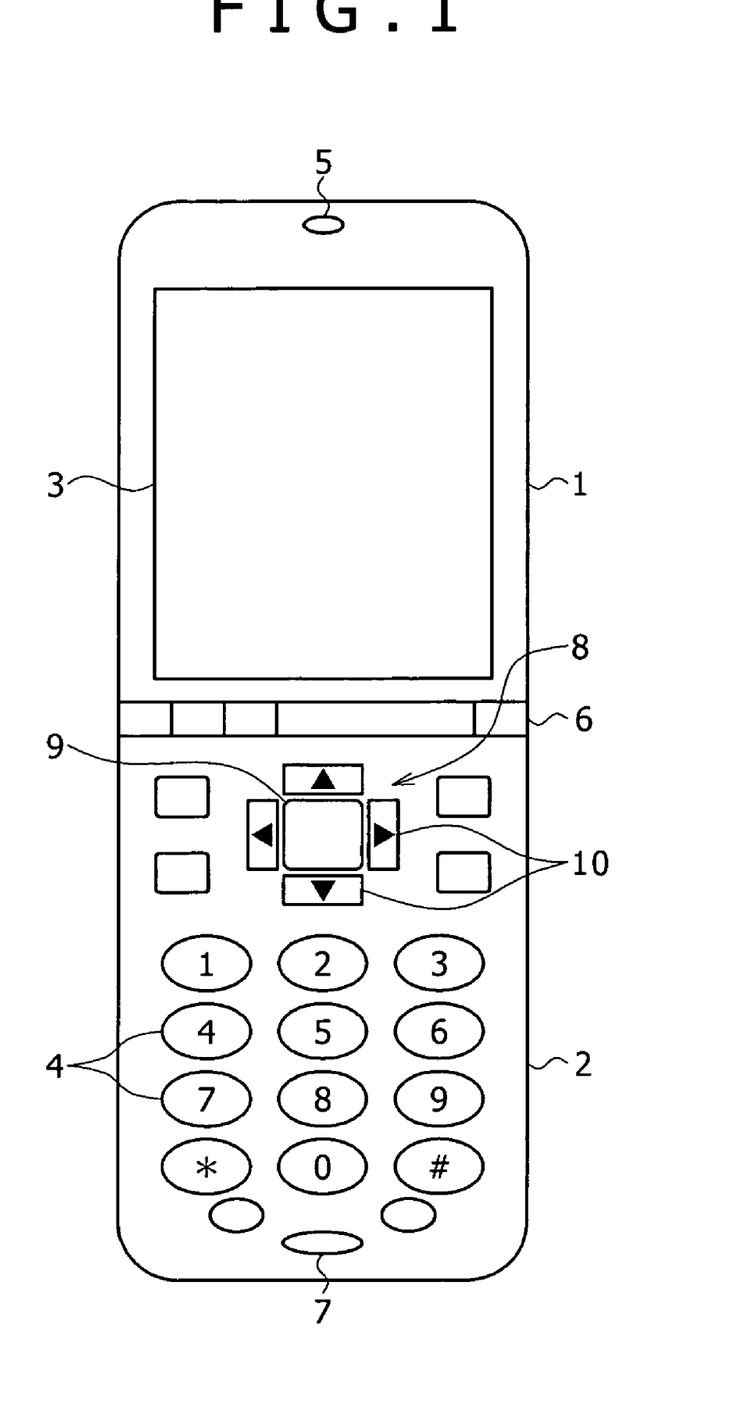
FIG. 1 is a front view of a general the exterior of a foldable mobile phone terminal in an open (unfolded) state according to an embodiment of the present invention.
Figure 2:
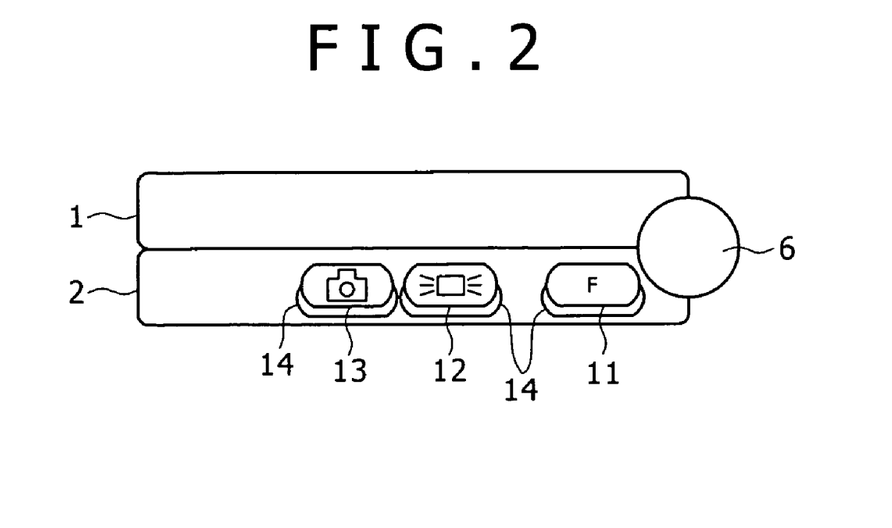
FIG. 2 is a side view of a general exterior of the foldable mobile phone terminal in a closed (folded) state according to the embodiment.

FIGS. 1 and 2 show an example of an exterior configuration of a mobile phone terminal of the present embodiment according to the present invention.

The mobile phone terminal according the present embodiment is a so-called foldable mobile phone terminal. For example, the phone terminal has first and second housings 1 and 2 that are foldable (in two sides) via a hinge portion 6 (coupling means) so as to overlap with one another. More specifically, the mobile phone terminal of the present embodiment is configured such that the first and second housings 1 and 2 are coupled by the hinge portion 6, in which the positional relationship between the housings 1 and 2 is changeable via the hinge portion 6. FIG. 1 is a front view of a general exterior of the foldable mobile phone terminal in an open (unfolded) state; and FIG. 2 is a side view of a general exterior of the foldable mobile phone terminal in a closed (folded) state.

With reference to FIG. 1, the first housing 1 has, for example, a main LC (liquid crystal) display 3 formed of an LC (liquid crystal) device, and a receiving speaker 5. Although not shown, on a rear face side (rear face side with respect to the side of the main LC display 3) of the first housing 1, there are provided, for example, a sub-LC display formed of an LC device, a camera section, and an imaging auxiliary light that emits imaging auxiliary light in the event of imaging operation of the camera section.

The housing 2 contains a major circuit section of the mobile phone terminal. On an upper surface (face opposing the side of the main liquid crystal display 3 of the first housing 1 when folded) of the second housing 2, there are provided ten keys 4 (12 keys) respectively serving as key buttons for inputting, for example, telephone numbers and characters; keys such as a termination/power key; a button 9 for being depressed in the event of menu operation, for example; and a cross-shaped key device 8 having specification keys 10 provided in upper, lower, left, and right portions about the button 9; and a transmitting microphone 7.

In addition, with reference to FIG. 2, in one sidewall portion of the second housing 2, there are provided, for example, an "F" key 11 for primarily being "long-depressed" (depressed for a long time interval) to display the balance of the electronic wallet on the LC display, an illumination key 12 for being depressed when turning on a backlight of the sub-LC display, and a camera key 13 for being depressed when activating the camera section. The "F" key 11, illumination key 12, and camera key 13 hereafter will be each referred to as a side key. A "back-bored recess" 14 is provided in a respective portion of the side key on a sidewall of the second housing 2, thereby to enable a user to easily find the side key even by groping. The shown disposing position of the respective side key is just an example, so that, for example, the "F" key 11 may be provided on a sidewall portion of the second housing 2.

Other ordinal or inherent configurations and portions of the mobile phone terminal are not specifically shown and described.

(Electronic Wallet Lock Function and Temporal Lock Release Function)

The mobile phone terminal of the present embodiment has an electronic wallet function, and a lock function for locking the electronic wallet function, and a release function for releasing the function.

In addition, the mobile phone terminal has a temporal release function that enables temporary release of the electronic wallet lock by use of the side keys provided in the sidewall portion of the second housing 2. In the description given hereinbelow, the temporal release of the electronic wallet lock will be referred to as "quicklock release" to be differentiated from the regular release of the electronic wallet lock. The function of quicklock release is specifically usable at least in the close state of the mobile phone terminal.

More specifically, the mobile phone terminal is rendered to behave as described hereinbelow. In the event that the electronic wallet function is locked, setting of the quicklock release function is ON, and concurrently, the mobile phone terminal is at least set to the close state, the operation mode of the terminal shifts to a quicklock release mode in response to a short depression (depression for a short time period) of the "F" key 11. Then, when the side keys are depressed in a sequence pre-registered by the user, the quicklock release function is executed to release the electronic wallet lock.

In the open state as well, according to the mobile phone terminal, in the event that the electronic wallet function is locked, and concurrently, the setting of the quicklock release function ON, and the operation mode shifts to the quicklock release mode in response to the short-depression of the "F" key 11. Then, when the respective side keys are depressed in the sequence pre-registered by the user, the quicklock release function is executed to temporarily release the electronic wallet lock release.

The lock release is thus executed in the manners described above, and it will be described in further detail, focusing on the quicklock release mode being carried out in the event that the mobile phone terminal is in the close state.

(Specification of Electronic Wallet Lock and Quicklock Release)

By reference to example display screens of the main LC display 3, shown in FIGS. 3 to 11, the following describes flow in the event of specification of the electronic wallet lock function and the quicklock release function in the mobile phone terminal of the present embodiment.

Figure 3:
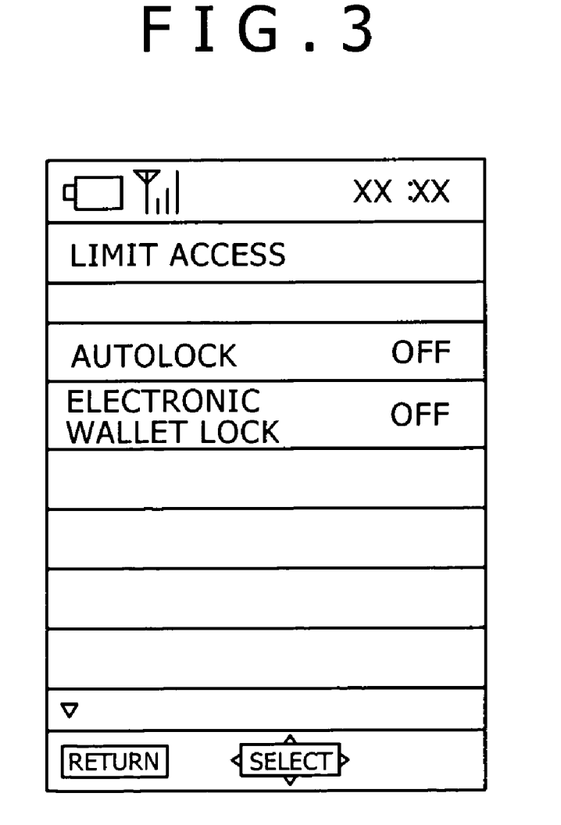
FIG. 3 is a view showing a display example of an access limitation menu screen.

In the present embodiment, among hierarchically structured menus, a menu for specification of the electronic wallet lock function is prepared to provide menu items regarding access limitations. As shown in FIG. 3, the menu regarding the access limitations has the menu items "Autolock" and "Electronic wallet lock".

First, a user operates the cross-shaped key device 8 of the second housing 2, and thereby selects a menu item "Electronic wallet lock" by using a cursor or the like. Further, in this state, the user depresses a key (determine button 9 on the second housing 2, for example) corresponding to a "Select" soft provided in a lower portion of the screen of FIG. 3. Then, in response to the operation, the mobile phone terminal of the present embodiment shifts to the process of the specification menu item "Electronic wallet lock".

Figure 4:
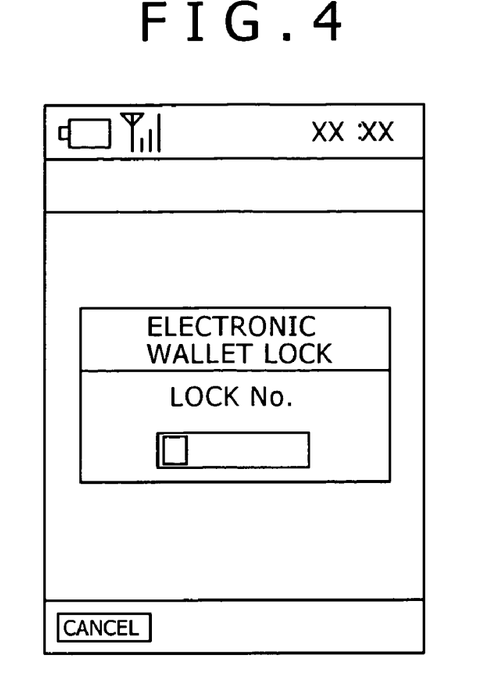
FIG. 4 is a view showing a display example of a personal ID (identification) number input screen for an electronic wallet lock.

Upon shifting to the process of a specification menu item "Electronic wallet lock", the mobile phone terminal displays on the main liquid crystal display 3 a personal ID number input screen for prompting the user to input a personal ID (identification) number for the use of specification and release of the electronic wallet lock, as shown in FIG. 4.

Figure 5:
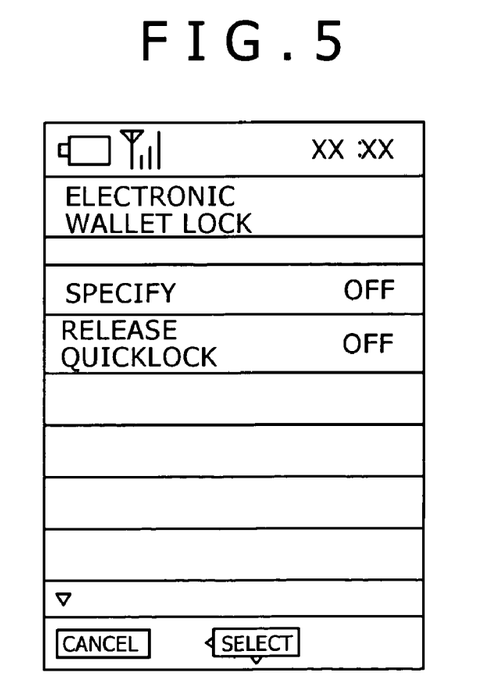
FIG. 5 is a view showing a display example of a menu screen for specifying the electronic wallet lock and a quicklock release thereof.

On the personal ID number input screen, when the user operates, for example, the ten keys 4, and thereby inputs a desired personal ID number, the mobile phone terminal displays on the main LC display 3 a menu screen for allowing specification of the electronic wallet lock and the quicklock release, as shown in FIG. 5. The menu screen for specification of the electronic wallet lock and the quicklock release is prepared to have a menu item "Specify" for specifying an ON/OFF setting of the electronic wallet lock, and a menu item "Release quicklock" for specifying an ON/OFF setting of the setting of the electronic wallet lock.

Figure 6:
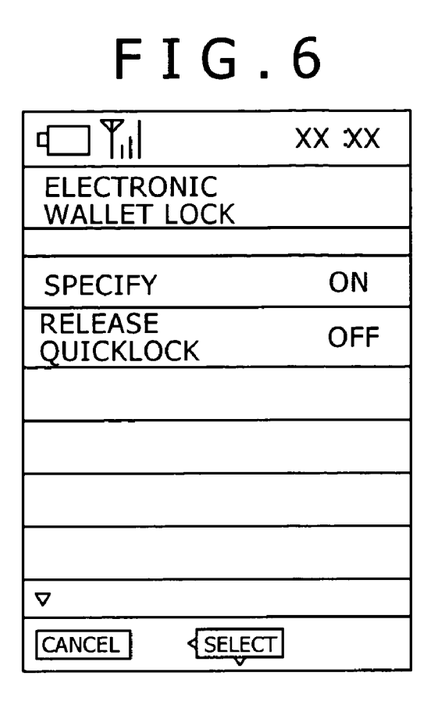
FIG. 6 is a view showing a display example of a menu screen in the state where the electronic wallet lock is specified to be ON for specification of the electronic wallet lock and specification of release of a quicklock.

Then, on the menu screen of FIG. 5, the user operates the cross-shaped key device 8, and thereby selects the menu item "Specify" by using the cursor or the like. Further, in this state, the user depresses the determine button 9 corresponding to a "Select" soft key provided in a lower portion of the screen of FIG. 5. Then, in response to the operation, the mobile phone terminal sets the electronic wallet to ON. When the electronic wallet lock is set to ON, the mobile phone terminal displays that the setting of the electronic wallet lock is turned ON, as shown in FIG. 6.

Figure 7:
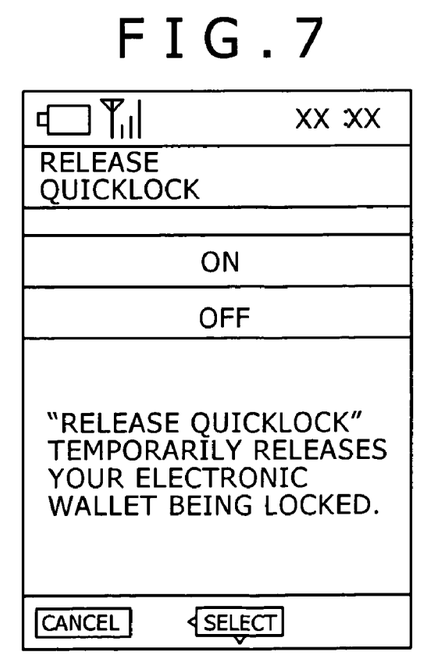
FIG. 7 is a view showing a display example of a guide text regarding the specification of the release of quicklock (or "quicklock release," hereafter)
Figure 8:
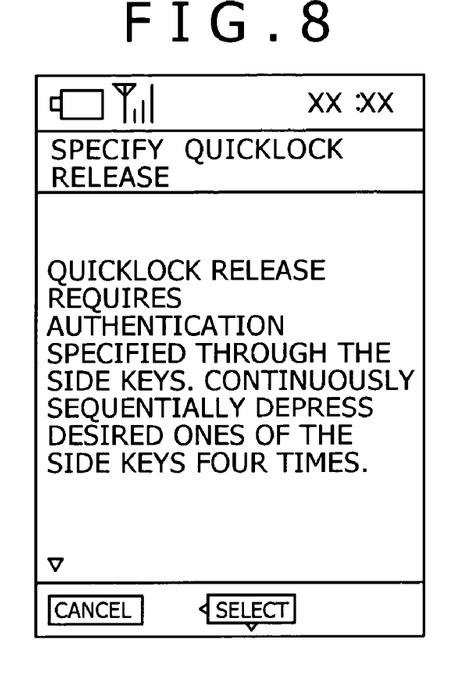
FIG. 8 is a view showing a display example of a guide text regarding a specification method of the quicklock release.
Figure 9:
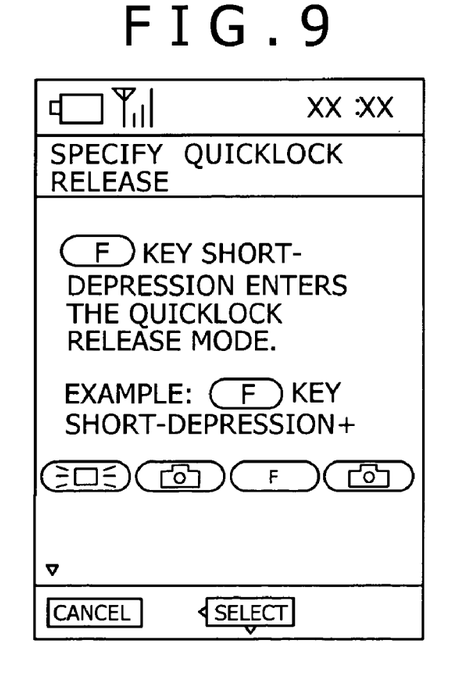
FIG. 9 is a view showing a display example of a guide text regarding a practical example of the specification method of the quicklock release.

Subsequently, on the menu screen of FIG. 6, the user operates the cross-shaped key device 8, and thereby depresses the menu item "Specify" by using the cursor or the like. Further, in this state, the user depresses the determine button 9 corresponding to a "Select" soft key provided in a lower portion of the screen of FIG. 6. Then, in response to the operation, the mobile phone terminal displays on the main LC display 3 a specification screen including a guide text regarding the quicklock release function and menu items for specifying the ON/OFF setting of the electronic wallet lock function has been set to ON, as shown in FIG. 7.

Subsequently, on the menu screen of FIG. 7, the user operates the cross-shaped key device 8, thereby selects a menu item "ON" under "Quicklock release" by using the cursor or the like. Further, in this state, the user depresses the determine button 9 corresponding to a "Select" soft key provided in a lower portion of the screen of FIG. 7. Then, in response to the operation, the mobile phone terminal displays on the main LC display 3 specification screens respectively including a guide text and a practical example thereof regarding a specification method for the quicklock release function. In the present embodiment, the quicklock release is specified in the manner that the respective side keys are depressed in a user desired sequence after the shift to the quicklock release mode, so that the main LC display 3 displays a guide text saying to the above effect and a practical side key depression example.

Figure 10:
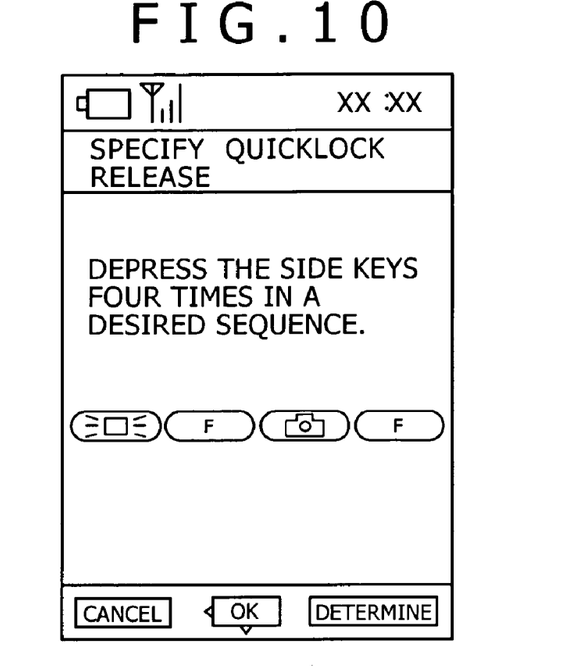
FIG. 10 is a view showing a display example in the event of specification of the quicklock release.

Subsequently, as shown in FIG. 10, the mobile phone terminal displays on the main LC display 3 a specification screen that prompts the user to depress the side keys in a desired sequence for specification and registration of the quicklock release. FIG. 10 shows an example in the event that the sequence of the illumination key 12, "F" key 11, camera key 13, and "F" key 11 is registered as an authentication key-in sequence for the quicklock release.

Then, the user operates the cross-shaped key device 8, and thereby depresses a determine button 9 corresponding to an "OK" soft key provided in a lower portion of the screen of FIG. 10. Then, in response to the operation, the mobile phone terminal displays on the main LC display 3 a notification screen provided to notify the user of termination of the specification of the quicklock release.

Figure 11:
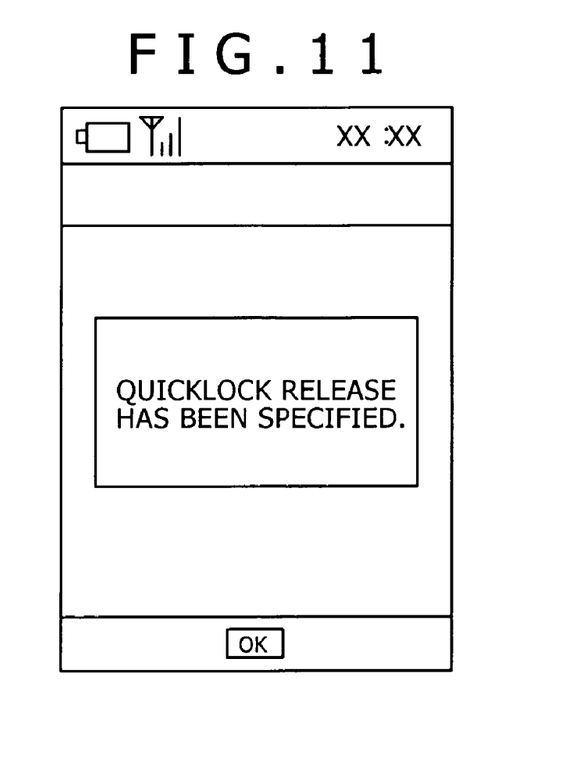
FIG. 11 is a view showing a display example in the event of specification completion of the quicklock release.

Thereafter, the user operates the cross-shaped key device 8, and thereby depresses the determine button 11 corresponding to an "OK" soft key provided in a lower portion of the screen of FIG. 11. Then, in response to the operation, the mobile phone terminal terminates the specification process for the quicklock release.

The specification and registration of the quicklock release is thus carried out. In this state, for example, suppose that the electronic wallet function is locked, the setting of the electronic wallet function is ON, and concurrently, the mobile phone terminal is in the close state. In this case, when the operation mode shifts to the quicklock release mode in response to short-depression of the "F" key 11, and then the side keys are depressed in the sequence of the illumination key 12, "F" key 11, camera key 13, and "F" key 11, the mobile phone terminal temporarily releases the electronic wallet lock.

(Interior Circuit Configuration of Mobile Phone Terminal)

Figure 12:
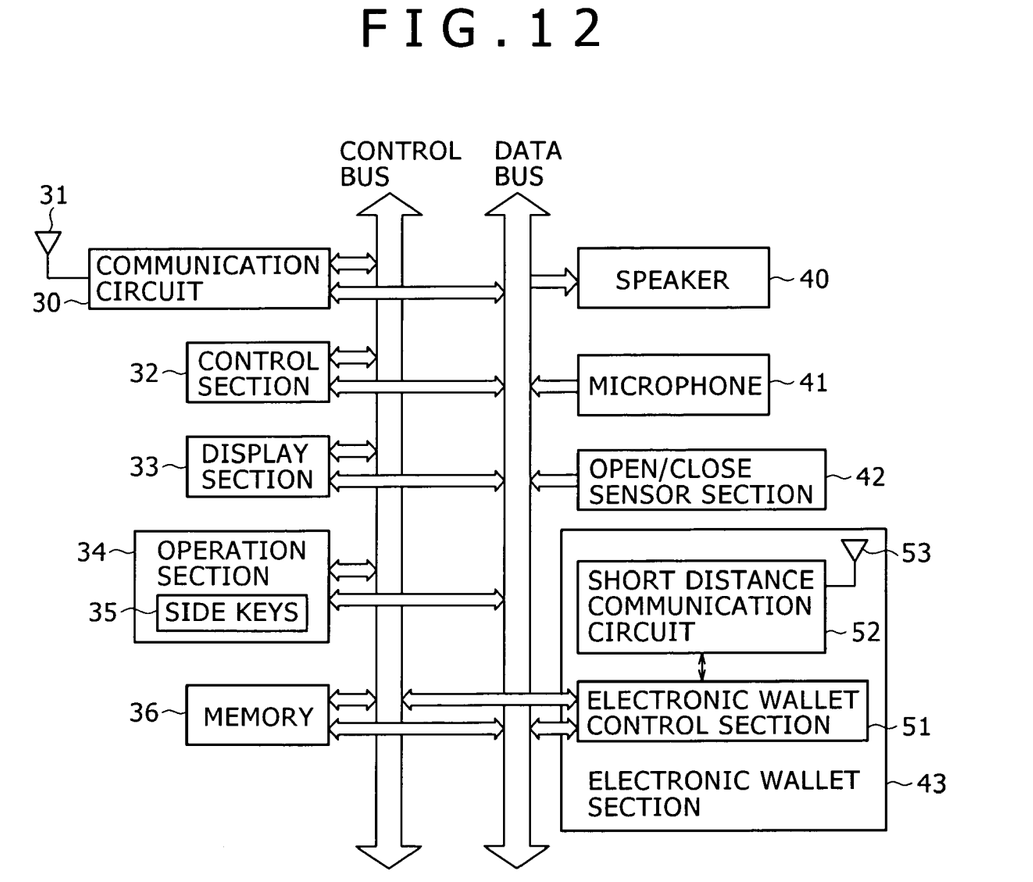
FIG. 12 is a block diagram showing a general interior configuration of the mobile phone terminal of the embodiment.

FIG. 12 shows a general interior configuration of the mobile phone terminal of the present embodiment according to the present invention.

An antenna 31 is, for example, a built-in antenna, and is used to transmit and receive signals for telephone or call communication and packet communication. A communication circuit 30 performs, for example, frequency conversion, modulation, and demodulation of transmission and reception signals. Data to be transmitted and received are, for example, image data, electronic mail data, program data, and various other types of data.

Call audio data received is sent to a control section 32 through a data line. The control section 32 includes a CPU (central processing unit), decodes call audio data, and sends the decoded audio data to a speaker 40 through a data line.

The speaker 40 corresponds to, for example, the receiving speaker 5 or a lingual speaker. The speaker 40 includes a digital/analog converter and an amplifier, whereby data of, for example, call audio or lingual audio is output after having been digital/analog converted and amplified. Thereby, the call audio or lingual audio can be obtained.

A microphone 41 corresponding to the transmitting microphone 7, and includes an analog/digital converter and an amplifier. A call audio signal having been input through the microphone 41 is amplified by the amplifier to a predetermined level and is then converted by the analog/digital converter into digital audio data. The signal is sent to the communication circuit 30 after having been sent to the control section 32 through the data line and coded.

A display section 33 includes, for example, the main liquid crystal display 3 and sub-LC display provided in the first housing 1, and a display control circuit that causes the images and the like to display on the LC displays.

An operation portion 34 corresponds to the second housing 2. This portion 34 includes, but not limited to, ten keys 4, off-hook key, clear key, termination/power key, and cross-shaped key device 8, and side keys 35 such as "F" key 11, illumination key 12, and camera key 13. In addition, the operation portion 34 includes an operation signal generation section.

A memory 36 includes a ROM (read-only memory) and a RAM (random access memory).

The ROM contains, but not limited to, control programs with which the control section 32 controls the respective sections; various initialization values (or, default setting values); font data and dictionary data; program codes for execution of the electronic wallet function and lock function and the quicklock release function, for example; application program codes for processes such as electronic mail creation and editing; application program codes for various processes of images; various other application program codes contained in the mobile phone terminal; and identification information (ID) of the mobile phone terminal.

The ROM includes a writable ROM, such as an EEPROM (electrically erasable programmable read-only memory). The ROM has a capacity of storing, but not limited to, electronic mail data; data such as telephone directories and electronic mail addresses set by the user; data such as photographic image data captured by the camera section, downloaded photographic data, and incoming call sound data; data such as character data, candidate word registration data of prediction conversion, and learning data of prediction conversion; information such as personal ID numbers for releasing the electronic wallet lock of the present embodiment, and authentication key-in sequences for quicklock release; and various other user specification values.

The RAM functions as work area to store by necessity data in various processes by the control section 32.

An open/close sensor section 42 has, for example, a switch sensor capable of sensing whether the current state of the mobile phone terminal is in the open state as shown in FIG. 1 or in the close state as shown in FIG. 2.

An electronic wallet section 43 is formed of a contactless IC card. The electronic wallet section 43 has a short distance communication circuit 52, an electronic wallet control section 51, and a memory (not shown). The communication circuit 52 performs radio information communication through a short distance communication antenna 53 with, for example, an electronic wallet reader/writer provided in an automatic checking and collecting machine of a station or in a checkout counter of a store. The control section 51 performs operation control of the short distance communication circuit 52 and for performing information communication with the control section 32.

The contactless IC may either be of the type incorporated in the mobile phone terminal or be an external IC card detachable therefrom. In the case of the external IC card, the mobile phone terminal has an external IC card slot, in which the contactless IC card is inserted into the external IC card slot.

The control section 32 performs various arithmetic processes via control lines, such as encoding and decoding of the call audio data, and control of respective components of the mobile phone terminal. In addition, in the present embodiment, the control section 32 executes the electronic wallet function and the lock function and quicklock release function thereof in accordance with, for example, the program codes stored in the memory 36, and information such as personal ID number and authentication key-in sequence for the quicklock release.

Although not shown in FIG. 12, the mobile phone terminal of the present embodiment additionally has, but not limited to, a power supply circuit for supplying power to respective sections; a recording and playback section for performing recording and playback of music and images, for example; a browser function; an external cable connector; a connector for an external remote controller; a GPS (global positioning system) functioning as a position-fix device for detecting the current position of the mobile phone terminal; and an antenna thereof; and an imaging device and an image processing circuit of the camera section.

(Flowchart Diagram of Mode Shift Responsive to Specification of Electronic Wallet Lock and Quicklock Release)

Figure 13:
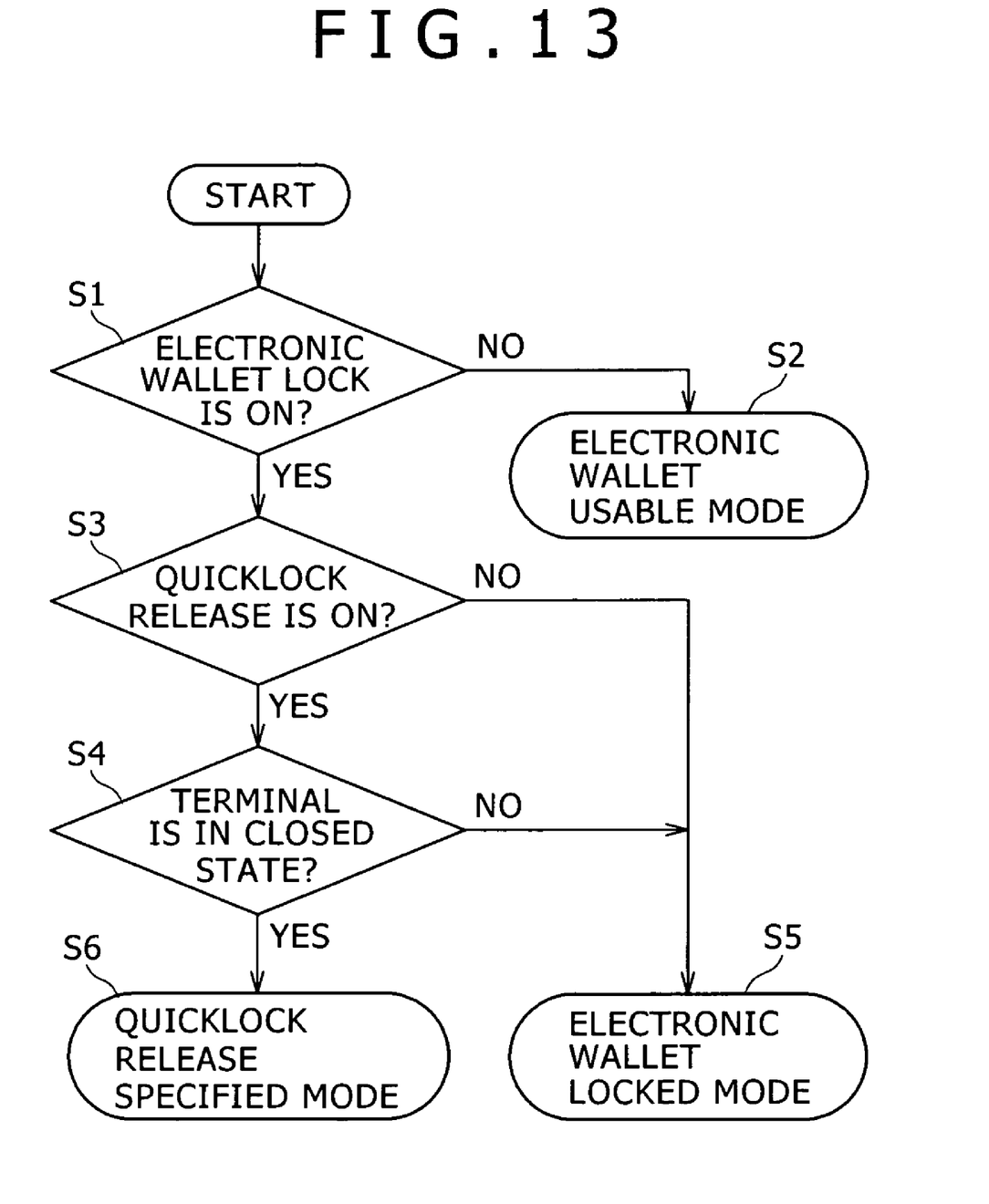
FIG. 13 is a flowchart diagram showing the flow of mode shifts corresponding to ON/OFF specification and an open/close state of the electronic wallet lock and the quicklock release in the mobile phone terminal of the embodiment.

FIG. 13 is a flowchart diagram showing flow of mode shift responsive to the ON/OFF specification and open/close state of the electronic wallet lock and to the quicklock release in the mobile phone terminal of the present embodiment. Processing according to the flowchart diagram shown in FIG. 13, primarily, is executed by the control section 32 in accordance with a program code stored in the control section 32.

In the processing shown in the flowchart diagram of FIG. 13, as a process of step 1, the control section 32 performs a process of step 1, thereby referencing specified information stored in the memory 36 and determining whether the setting of the electronic wallet lock is ON. If at step S1 it is determined that the setting of the electronic wallet lock is OFF (No), the control section 32 performs a process of step 2, thereby to set the electronic wallet function of the mobile phone terminal to a normally usable mode.

Alternately, if at step S1 it is determined that the setting of the electronic wallet lock is ON (Yes), then the control section 32 performs a process of step S3, thereby determining by looking up the specified information in the memory 36 whether the setting of quicklock release is ON. If at step S3 it is determined that the setting of the quicklock release is OFF (No), then the control section 32 performs a process of step S5, thereby setting the mobile phone terminal to the normal electronic wallet lock mode.

Alternately, if at step S3 it is determined that the setting of the quicklock release is ON (Yes), then the control section 32 performs a process of step S4. Thereby, the control section 32 determines in accordance with a signal from the open/close sensor section 42 whether the mobile phone terminal is in the open state or close state. If it is determined that the terminal is in the open state (No), then the control section 32 performs a process of step S5, thereby setting the mobile phone terminal to the normal electronic wallet lock mode.

A case is now assumed as follows. At step S5, when the mobile phone terminal is in the electronic wallet lock mode, menu selection is carried out through the operation of, for example, the cross-shaped key device 8, whereby the menu "electronic wallet lock" is selected from the menus regarding the access limitations. Subsequently, a personal ID number is input through the operation of the ten keys 4, and selection is carried out on the menu item "Specify" to set the electronic wallet lock to OFF. In this case, the control section 32 controls the respective sections to release the electronic wallet lock.

In addition, if at step S4 it is determined that the mobile phone terminal is in the close state (Yes), the control section 32 performs a process of step S6, thereby setting the terminal to the quicklock release specified mode.

(Flowchart Diagram in Quicklock Release Specified Mode)

Figure 14:
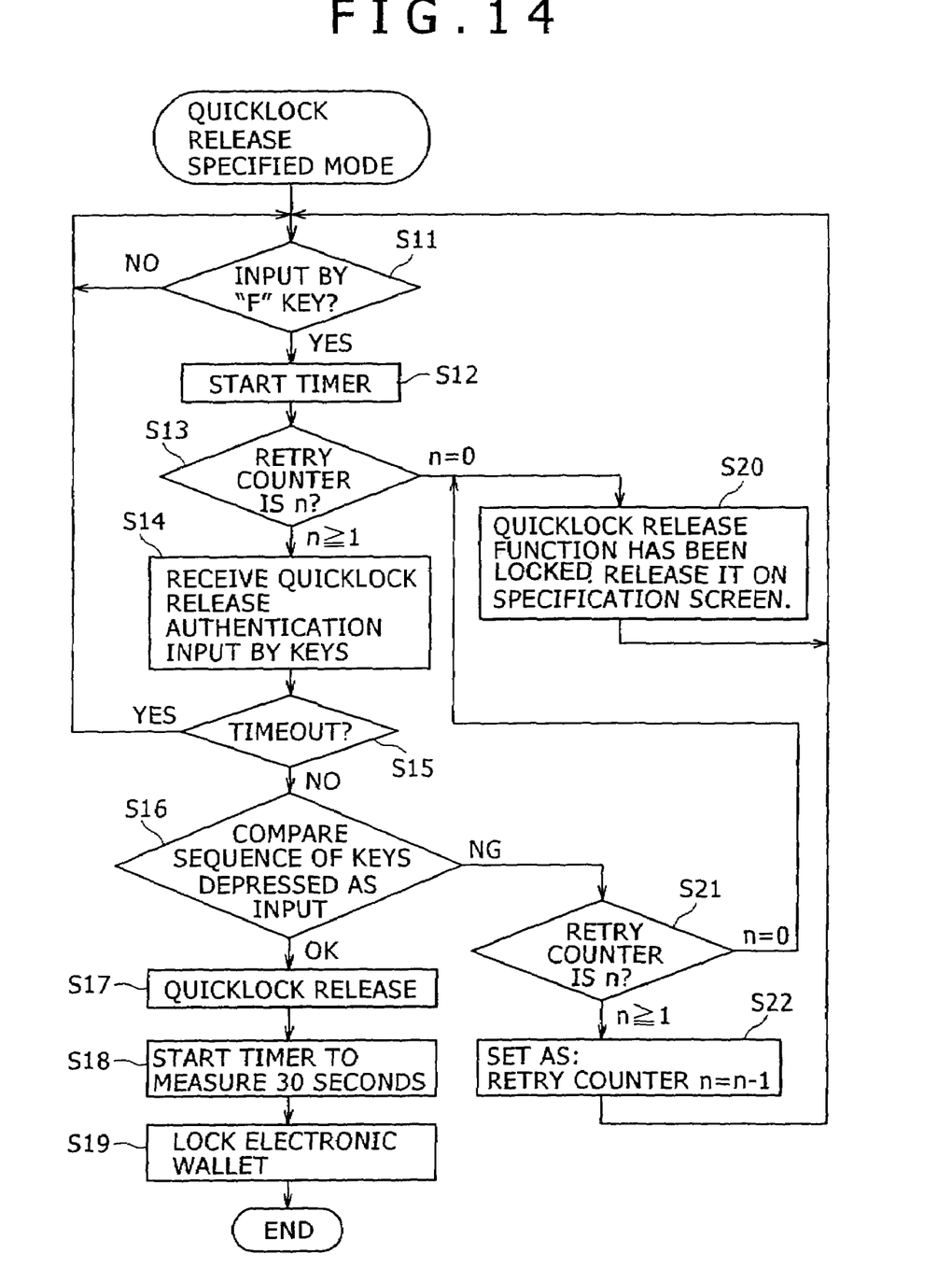
FIG. 14 is a flowchart diagram showing operation in the event that the mobile phone terminal of the embodiment is in a quicklock release specified mode.

FIG. 14 shows operation in the event that the mobile phone terminal of the present embodiment is in the quicklock release specified mode. The process according to the flowchart diagram, primarily, is performed by the control section 32 in accordance with a program code stored in the memory 36.

In the flowchart diagram shown in FIG. 14, in the quicklock release specified mode of the mobile phone terminal, control section 32 performs a process of step S11. At this step, while observing operation signals from the side keys of the operation portion 34, the control section 32 determines whether the "F" key of the side keys has been short-depressed. If at step S11 it is determined that the "F" key has been short-depressed, the control section 32 proceeds to a process of step S12.

In the process of step S12, the control section 32 activates an internal timer, thereby starting time measurement. The time measurement by the timer is performed to measure a period of time allowing acceptance of authentication key-in input through side key depression for the quicklock release after the shift to the quicklock release mode through short-depression of the "F" key in the quicklock release specified mode. In the present embodiment, for example, a period of five seconds is set as the period of time allowing acceptance of authentication key-in input through side key depression for the quicklock release after the shift to the quicklock release mode through short-depression of the "F" key.

After the start of the timer at step S12, the control section 32 performs a process of step S13. At step 13, it is determined whether a value n of a retry counter for counting the number of allowable retry in the event of error in the authentication key-in input through the side key depression for the quicklock release is greater than or equal to 1 ($n \geq 1$). That is, it is determined whether the number of allowable retry operations through side key depression for the authentication key-in input for the quicklock release is not zero. In the present embodiment, an initial value (or, default) of the value n is three, for example. If at step 13 it is determined that $n \geq 1$, then the control section 32 proceeds to step 14. Alternately, if at step 13 it is determined that n=0, then the control section 32 proceeds to a process step S20.

In the process of step S14, the control section 32 accepts input from the side keys 35. Further, at step S15, the control section 32 determines whether the time measured at step S12 has passed the period of time allowing acceptance of authentication key-in input through side key depression for the quicklock release (whether the timer has timed out). If the timer has not yet timed out, the control section 32 proceeds to step S16. Alternately, if the timer has timed out, the control section 32 control the processing to return to the process before step S11.

In a process of step S16, the control section 32 makes a comparison between a sequence of keys depressed as input through the side keys 35 and an authentication key-in input sequence registered in the memory 36. If a match between the sequences has been detected, the processing proceeds to step S21. Alternately, if the match has not been detected, the processing proceeds to step S17.

In a process of step S17, the control section 32 performs the process of quicklock release for setting the electronic wallet lock to the temporarily released state. Then, the control section 32 performs a process of step S18, thereby activating the interior timer to start time measurement. The time measurement by the timer in the process of step 18 is performed to measure a period of time during which the electronic wallet lock is in the temporarily released state. In the present embodiment, for example, a period of 30 seconds is set as the period of time during which the electronic wallet lock is in the temporarily released state. After the temporary release time of the electronic wallet lock at step 18 has passed, the control section 32 performs a process of step 19, thereby locking the electronic wallet. Then, the processing returns to the quicklock release specified mode.

If at step 16 it is determined that the match exists between the sequence of the keys depressed as input by using the side keys 35 and the authentication key-in input sequence registered in the memory 36, the processing proceeds to a process of step 21. In this event, the control section 32 determines whether the value n of the retry counter is greater than or equal to 1 ($n \geq 1$). That is, it is determined whether the number of allowable retry operations through side key depression for the authentication key-in input for the quicklock release is not zero. Then, if at step 21 it is determined that $n \geq 1$, the control section 32 performs a process of step 22, thereby decrementing the value n of the retry counter by one (that is, the number of allowable retry is decremented by one). Then, the processing returns to the process of step 11. Alternately, if at step 21 it is determined that n=0, the processing proceeds to the process of step S20.

In the event of the processing has proceeded to the process of step S20; that is, in the event that the number of errors in authentication key-in input through the side key depression for the quicklock release has exceeded the number of allowable retry, the control section 32 stops (locks) the quicklock release function. Then, the control section 32 causes, for example, the sub-LC display to display a message. The message indicates that the quicklock release function is locked and that a release method for the regular electronic wallet lock has to be carried out to use the electronic wallet.

As described above, the mobile phone terminal according to the present embodiment behaves in the following manners. In the event that the electronic wallet function is locked, the setting of the quicklock release function is ON, and concurrently, the mobile phone terminal is in the close state, the operation mode of the terminal shifts to the quicklock release mode in response to the short depression of the "F" key 11. Then, when the authentication key input is carried out in the proper depression order of the side keys within the predetermined period of time (within five seconds, for example), the electronic wallet lock is temporarily released (for 30 seconds). Consequently, maintenance of the security function and easy and speedy lock release of the electronic wallet are compatible with one another.

More specifically, according to the mobile phone terminal (foldable mobile phone terminal) of the present embodiment, the terminal need not be opened, but the lock of the electronic wallet can be released only through the operation of the side keys, so that the electronic wallet can be instantly used when necessary. In addition, since the electronic wallet is automatically locked when a predetermined period of time has elapsed after the use of the electronic wallet, the security function can be maintained. In addition, according to the mobile phone terminal of the present embodiment, when the authentication key input for the quicklock release has been erroneously carried out the predetermined times (three times, for example), the operation mode shifts back to the regular electronic wallet lock mode. Accordingly, the mobile phone terminal can be effectively protected from, for example, illegal use of the electronic wallet by a third party. Further, the mobile phone terminal has the function of automatically returning the operation mode to the quicklock release specified mode. Accordingly, even when the "F" key is erroneously depressed by an external force, unless the authentication key input for the quicklock release is carried out through the side keys within the predetermined period of time (within five seconds, for example), no case occurs in which the operation mode erroneously returns to the regular electronic wallet lock mode.

Further, according to the mobile phone terminal of the present embodiment, the operation mode is set to the regular electronic wallet lock mode in the open state, and the operation mode is set to the quicklock release specified mode in the close state. Accordingly, as shown in FIG. 15 by way of example, the high security performance attributed to the electronic wallet lock mode can be achieved compatibly with speedy lock release of the electronic wallet in the state the security performance attributed to the quicklock release specified mode is maintained.

Figure 15:
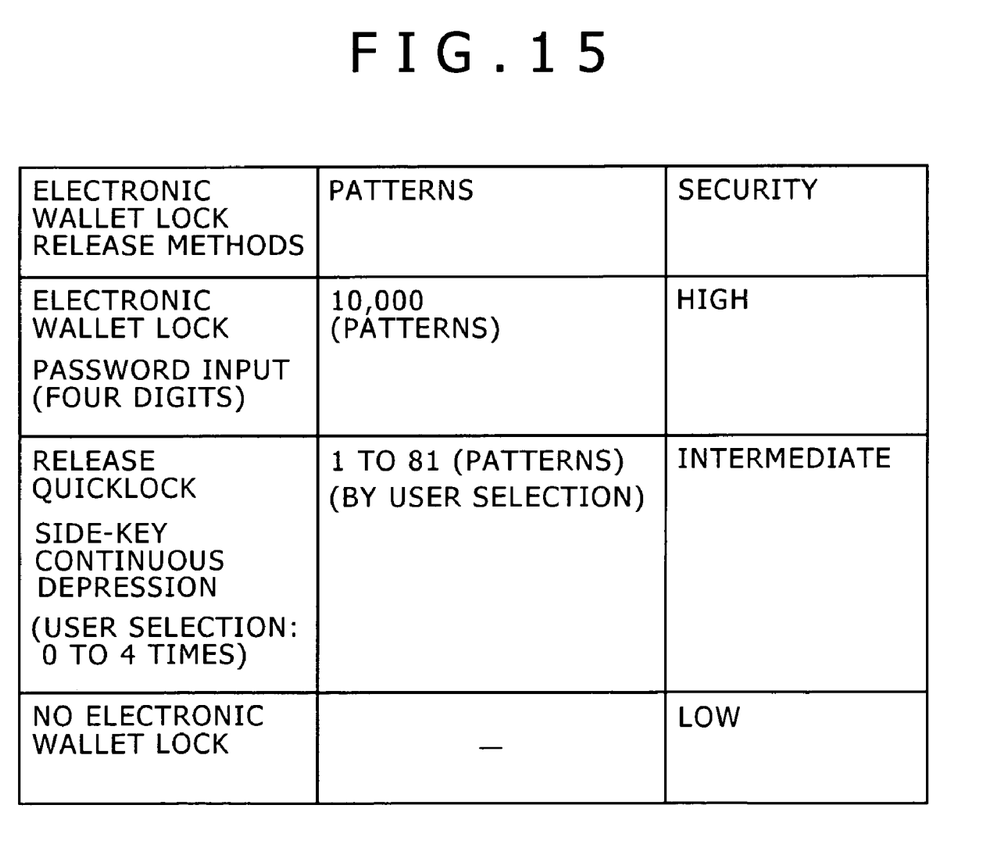
FIG. 15 is a table descriptive of the number of release patterns and security performance in the event of release of the electronic wallet lock and quicklock in the mobile phone terminal of the embodiment.

More specifically, as shown in FIG. 15, according to the mobile phone terminal, 10,000 patterns of lock release of the electronic wallet can be specified by inputting four-digit personal ID numbers in the electronic wallet lock mode in the open state of the terminal. Accordingly, the high security performance can be achieved. In addition, in the quicklock release specified mode in the close state of the terminal, 81 patterns of lock release of the electronic wallet can be specified through 0 to 4 times of the authentication key input. Accordingly, a certain level (intermediate level) of security is secured, and concurrently, speedy lock release of the electronic wallet can be implemented.

In addition, according to the mobile phone terminal, in the open state as well, not only the electronic wallet lock is completely released through input of the personal ID number, but also the operation mode is specifiable to the quicklock release specified mode. Accordingly, even in the open state of the terminal, speedy lock release of the electronic wallet can be carried out. By way of reference, FIG. 15 shows also the security (low level of security) in the event that the electronic wallet lock is not used.

The embodiment described above is just an example of the present invention. The present invention is not limited to the respective embodiment, and the invention may be modified in various ways depending on the design and the like without departing from the scope of the technical concepts of the present invention.

Thus, although the present embodiment has been described with reference to the exemplified foldable mobile phone terminal, the present invention is adaptable also to a case as described hereinbelow. The case refers to a terminal (rotationally-open type terminal) configured such that a first housing having a display section and a second housing having multiple key operation sections are horizontally rotatable via a hinge mechanism having a rotation shaft substantially perpendicular to a surface (major surface) on which either the display section or key operation sections are provided. In the configuration, the operation mode is set to the quicklock release specified mode at least in the state where the first and second housings overlap with each other (in the state of the terminal opened).

Further, the present invention is adaptable also to the case of a slide-type terminal configured such that a first housing having a display section and a second housing having operation portions on a surface oriented in the same direction as a display surface of the display section are horizontally, linearly slidable so as to oppose each other. The operation mode is set to the quicklock release specified mode at least in the state where the first and second housings overlap with each other (in the state of the terminal closed).

In the mobile phone terminal of the present embodiment, the electronic wallet lock function and the quicklock function can be rendered remotely operable in response to a lock specification signal externally supplied via, for example, a mobile phone network. In the remote operation, the electronic wallet lock function and the quicklock function are synchronously or discretely controllable.

In addition, in the embodiment described above, although the mobile phone terminal is exemplified, the present invention is adaptable also to various mobile electronic apparatuses, such as PDAs and digital cameras.

Further, the present invention is not limited to, for example, the lock and the quicklock, but the invention is adaptable to, for example, locks and quicklocks regarding various other functions.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile electronic apparatus, comprising:
   at least two housings, including a first housing and a second housing;
   a hinge portion configured to couple the first housing and the second housing such that a relative positional state of the first housing to the second housing can change between a first positional state and a second positional state;
   a first operation section provided on any one of the first housing and the second housing, and configured to be operated by a user in the first positional state;
   a second operation section provided on any one of the first housing and the second housing and configured to be operated by the user only in the second positional state; and
   a control section configured to control an operation mode of the apparatus to any one of a first lock release mode and a second lock release mode when a predetermined function is locked to a stopped state, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section, and the control section is configured to control the operation mode to the first lock release mode when the positional state is at least in the first positional state, wherein, when a release operation of the stopped state of the predetermined function in response to an operation performed from the first operation section has failed a predetermined number of times within a first predetermined period of time in the first lock release mode, the control section fixes the operation mode to the second lock release mode.

2. A mobile electronic apparatus according to claim 1, further comprising:

a positional state sensor section configured to detect the relative positional state of the first housing and the second housing, wherein the relative positional state is dependent on the hinge portion, and when the predetermined function is locked to the stopped state, the control section controls the operation mode to the first lock release mode in response to a predetermined operation performed from the first operation section when the positional state sensor section has detected the first positional state, and controls the operation mode to the second lock release mode in response to a predetermined operation performed from the second operation section when the positional state sensor section has detected the second positional state.

3. A mobile electronic apparatus according to claim 2 or 1, wherein, when the stopped state of the predetermined function is released in response to a predetermined operation performed from the first operation section in the first lock release mode, the control section re-locks the stopped state of the predetermined function after a second predetermined period of time has passed.

4. A mobile electronic apparatus according to claim 2 or 1, wherein the control section locks the predetermined function to the stopped state in accordance with a lock specification signal received from the outside via a communication network.

5. A mobile electronic apparatus according to claim 2 or 1, wherein the control of the first lock release mode and the second lock release mode is specified and registered to be either valid or invalid.

6. A mobile electronic apparatus according to claim 2 or 1, wherein the stopped state of the predetermined function is temporarily released through a predetermined operation performed on the first operation section in the first lock release mode, and the stopped state of the predetermined function is temporarily released through a predetermined operation performed on the second operation section in the second lock release mode.

7. A mobile electronic apparatus including a first housing and a second housing configured to be set to an open state and a closed state via a hinge portion, comprising:

a first lock release function with which, when the first housing and the second housing are in the closed state and a predetermined function is locked, a lock of the predetermined function is temporarily released when a first operation section, disposed in a position to be able to be operated by a user in the closed state, is depressed in a pre-registered sequence and the pre-registered sequence is registered by the user when the first housing and the second housing are in the open state; and a second lock release function with which, when the first housing and the second housing are in the open state and the predetermined function is locked, the lock of the predetermined function is released when a second operation section, provided on any one of the first housing and the second housing, is operated, wherein, when a release operation of the locked predetermined function in response to an operation performed from the first operation section has failed a predetermined number of times within a predetermined period of time in the first lock release function, the control section fixes a function of the mobile electronic apparatus to the second lock release function.

8. A mobile electronic apparatus according to claim 7, wherein the first operation section includes side keys provided on a sidewall of any one of the first housing and the second housing, and the second operation section includes ten keys.

9. A mobile electronic apparatus according to claim 7, wherein the predetermined function is an electronic wallet function.

10. A mobile electronic apparatus according to claim 7, wherein the operation on the second operation section for releasing the lock with the second lock release function corresponds to an input operation by the user for inputting a personal identification (ID) number.

11. A mobile electronic apparatus according to claim 7, wherein the first operation section is configured to be operated to release the lock with the first lock release function and includes a plurality of side keys provided on a sidewall of any one of the first housing and the second housing, and when the first housing and the second housing are in the closed state, the predetermined function is locked, and a predetermined key of the side keys is depressed, then the first lock release function is shifted to a quicklock release mode and, when the side keys are depressed in the pre-registered sequence, the lock of the predetermined function is temporarily released.

12. A function control method for a mobile electronic apparatus, including at least two housings, including a first housing and a second housing; a hinge portion configured to couple the first housing and the second housing such that a relative positional state of the first housing to the second housing can change between a first positional state and a second positional state; a first operation section provided on any one of the first housing and the second housing, and configured to be operated by a user in the first positional state; and a second operation section provided on any one of the first housing and the second housing, and configured to be operated by the user only in the second positional state, the function control method comprising:

locking the predetermined function to a stopped state;

when the predetermined function is locked to the stopped state, controlling an operation mode to any one of a first lock release mode and a second lock release mode, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section;

controlling the operation mode to the first lock release mode when the positional state is at least in the first positional state;

setting the predetermined operation according to an input by the user when the first housing and the second housing are in the second positional state; and fixing the operation mode to the second lock release mode when a release operation of the stopped state of the predetermined function in response to an operation performed from the first operation section has failed a predetermined number of times within a predetermined period of time in the first lock release mode.

13. A function control program for a mobile electronic apparatus stored on a computer readable medium, the mobile electronic apparatus including at least two housings, including a first housing and a second housing; a hinge portion configured to couple the first housing and the second housing such that a relative positional state of the first housing to the second housing can change between a first positional state and a second positional state; a first operation section provided on any one of the first housing and the second housing, and configured to be operated by a user in the first positional state; and a second operation section provided on any one of the first housing and the second housing, and configured to be operated by the user only in the second positional state, the function control program comprising:

when the predetermined function is locked to a stopped state, controlling an operation mode to any one of a first lock release mode and a second lock release mode, the first lock release mode causing the stopped state of the predetermined function to be releasable in response to a predetermined operation performed from the first operation section, and the second lock release mode causing the stopped state of the predetermined function to be completely releasable in response to a predetermined operation performed from the second operation section;

controlling the operation mode to the first lock release mode when the positional state is at least in the first positional state;

setting the predetermined operation according to an input by the user when the first housing and the second housing are in the second positional state; and fixing the operation mode to the second lock release mode when a release operation of the stopped state of the predetermined function in response to an operation performed from the first operation section has failed a predetermined number of times within a predetermined period of time in the first lock release mode.

14. A mobile electronic apparatus according to claim 1, wherein the first operation section includes a plurality of keys, and the predetermined operation includes pressing the plurality of keys in a sequence defined by the user.

15. A mobile electronic apparatus according to claim 7, wherein the first housing or the second housing includes a plurality of keys provided on a sidewall thereof, and the pre-registered sequence includes pressing the plurality of keys in a sequence defined by the user.

16. A function control method according to claim 12, wherein the first operation section includes a plurality of keys, and the setting the predetermined operation includes pressing the plurality of keys in a sequence defined by the user.

17. A function control program according to claim 13, wherein the first operation section includes a plurality of keys, and the setting the predetermined operation includes pressing the plurality of keys in a sequence defined by the user.

* * * * *